(12) United States Patent
Paiz et al.

(10) Patent No.: US 11,450,167 B2
(45) Date of Patent: Sep. 20, 2022

(54) BALLOT AND ENVELOPE SYSTEM AND METHODS THEREOF

(71) Applicant: Runbeck Election Services Inc., Tempe, AZ (US)

(72) Inventors: Anthony Paiz, Tempe, AZ (US); Chris Schiffhauer, Tempe, AZ (US)

(73) Assignee: Runbeck Election Services Inc., Phoenix, AZ (US)

( * ) Notice: Subject to any disclaimer, the term of this patent is extended or adjusted under 35 U.S.C. 154(b) by 0 days.

(21) Appl. No.: 17/235,682

(22) Filed: Apr. 20, 2021

(65) Prior Publication Data

US 2021/0327192 A1 Oct. 21, 2021

Related U.S. Application Data

(60) Provisional application No. 63/012,505, filed on Apr. 20, 2020.

(51) Int. Cl.

| | |
|---|---|
| *G07C 13/00* | (2006.01) |
| *G07C 13/02* | (2006.01) |
| *G06Q 10/04* | (2012.01) |
| *G06K 19/06* | (2006.01) |

(52) U.S. Cl.
CPC ............. *G07C 13/02* (2013.01); *G06K 19/06* (2013.01); *G06Q 10/04* (2013.01); *G06K 2019/06225* (2013.01); *G06Q 2230/00* (2013.01)

(58) Field of Classification Search
CPC .................... G07C 13/02; G06K 19/06; G06K 2019/06225; G06Q 10/04; G06Q 2230/00

USPC ........................................................ 235/386
See application file for complete search history.

(56) References Cited

U.S. PATENT DOCUMENTS

| | | | |
|---|---|---|---|
| 7,883,014 B2 | 2/2011 | Runbeck et al. | |
| 8,712,829 B2 | 4/2014 | Runbeck et al. | |
| 9,087,422 B2 | 7/2015 | Runbeck et al. | |
| 9,196,105 B2 | 11/2015 | Runbeck et al. | |
| 2005/0263594 A1* | 12/2005 | Onischu | G06Q 30/08 235/386 |
| 2007/0007341 A1* | 1/2007 | Poulin | G07C 13/00 235/386 |

* cited by examiner

*Primary Examiner* — Jamara A Franklin
(74) *Attorney, Agent, or Firm* — Polsinelli PC

(57) ABSTRACT

A computer-implemented system includes a printing apparatus and a processor. The printing apparatus is configured for printing a ballot and an envelope associated with the ballot and a voter. The processor is configured to access a request file defining voter data from a voter registration database and generate a set of print instructions including ballot print instructions for a ballot and envelope print instructions for an envelope. Both of the ballot print instructions and the envelope print instructions are generated using the request file, and the set of print instructions includes instructions for printing a first machine-readable identifier for the envelope. The processor is further configured to transmit an instruction to the printing apparatus to print the ballot and the envelope using at least a portion of the voter data defined by the request file, the envelope including the first machine-readable identifier corresponding to the voter.

14 Claims, 9 Drawing Sheets

FIG. 4B

BALLOT AND ENVELOPE SYSTEM AND METHODS THEREOF

CROSS REFERENCE TO RELATED APPLICATIONS

The present application claims benefit to U.S. provisional patent application Ser. No. 63/012,505; filed on Apr. 20, 2020, which is incorporated by reference in entirety.

FIELD

The present disclosure generally relates to a computer-implemented system for elections services; and in particular, relates to a computer-implemented system for printing ballots and associated ballot envelopes securely and on demand.

BACKGROUND

During elections, processing of elections documents must be conducted in an efficient yet highly accurate manner. In the context of mail-in voting or voting on-demand, various technical challenges can impact this processing. For example, in most cases, voting on-demand involves a voter entering a polling location where the voter's information is then accessed and voter eligibility is evaluated. A ballot or other elections document must then be printed for the voter that aligns with the voter's information and complies with applicable rules and regulations. Printing an elections document that is suitable for the voter while maintaining security is of particular importance in early voting environments, and it is believed that current technology is insufficient to meet the unique demands of ballot and envelope production in this elections context.

It is with these observations in mind, among others, that various aspects of the present disclosure were conceived and developed.

BRIEF DESCRIPTION OF THE DRAWINGS

FIG. 4B is a portion of a screenshot showing aspects of an exemplary configuration file leveraged by a processor in view of the request file to generate print instructions for an envelope.

Corresponding reference characters indicate corresponding elements among the view of the drawings. The headings used in the figures do not limit the scope of the claims.

DETAILED DESCRIPTION

Figure 1A:
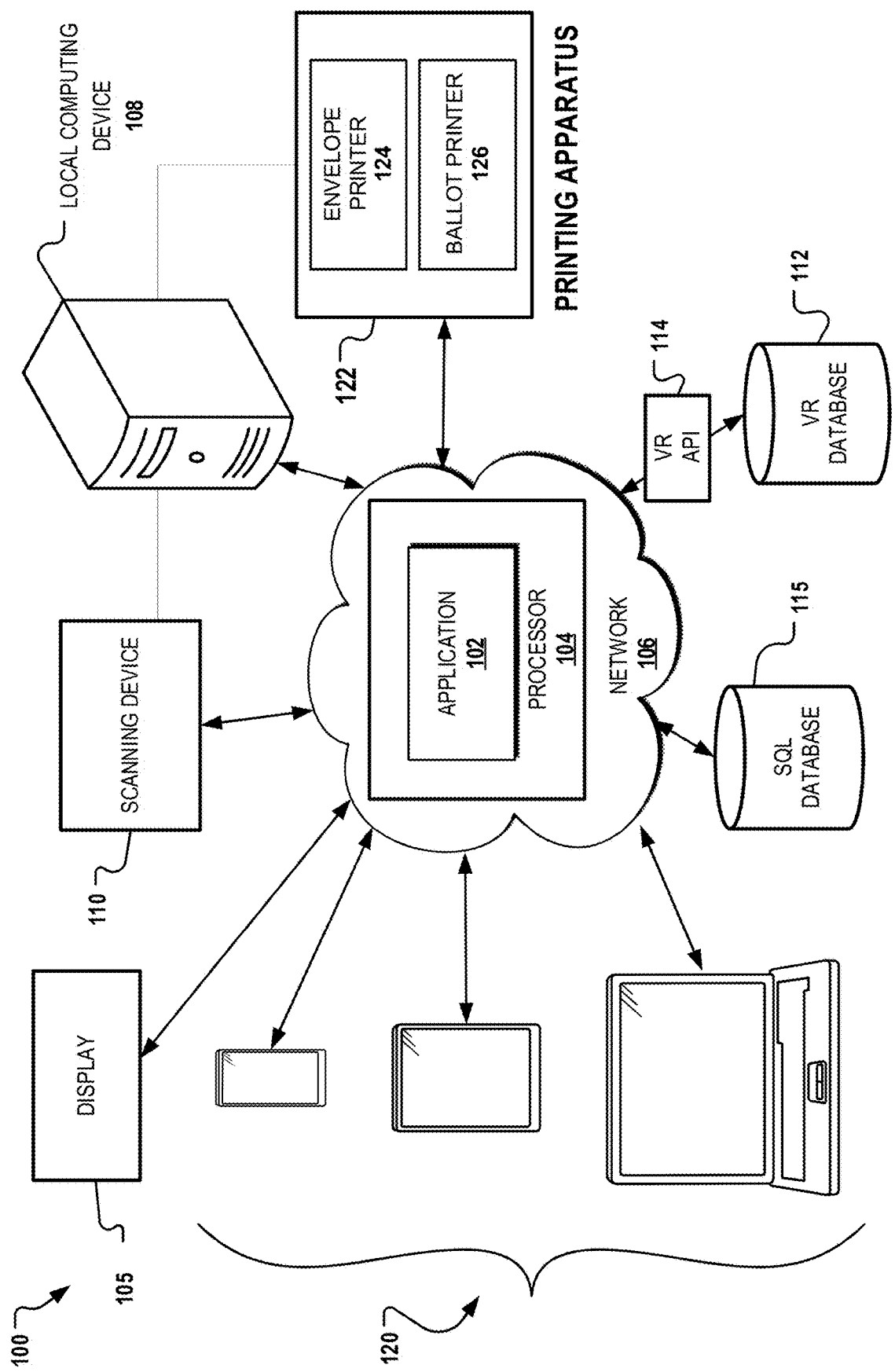
FIG. 1A is a network diagram illustrating an exemplary computer-implemented system for printing ballots and associated ballot envelopes securely and on demand.

The present disclosure relates to a system configured for managing aspects of election services; and more particularly, to a computer-implemented system for ballot and envelop printing on demand. In some embodiments, the computer-implemented system generally includes a printing apparatus comprising a ballot printer and an envelope printer. The printing apparatus receives instructions or is otherwise driven by an application executed by a processor that leverages a voter's information at check-in or received remotely or prior to an election, and instructs the printing apparatus to print predetermined information required by local elections laws on the ballot envelope and the corresponding ballot. More specifically, the computer-implemented system identifies and accesses a request file for ballot printing for a first printer (e.g., the ballot printer), and may leverage the same request file for a print job of a second printer (e.g., envelope printer) or otherwise leverage data associated with the same request file to print from the second printer without having to return to voter registration systems. For printing either of an envelope or ballot, the request file is based on information on record in a voter registration ("VR") database that may be leveraged to produce the ballot or envelope, and the ballot is printed in a manner that is identifiable by or otherwise tied to a corresponding envelope, and vice versa. The voter's ballot may then be secured inside the envelope after the voter has completed filling out the ballot to await future processing at an elections office.

The present computer-implemented system improves technology associated with ballot and elections document production by providing a secure, innovative, and effective solution for producing accurate envelopes and ballots and other documents on-demand. The application interacting with the printing apparatus described herein is configured for optimal performance and reduction in print time, and is designed to capture jurisdiction's requirements efficiently by way of, e.g., consolidated tabs and an improved WYSIWYG (What-you-see-is-what-you-get) user interface that accommodates editing functionality that is realized in finished elections documents products. In addition, the combination envelop and ballot printing software and hardware functions of the printing apparatus provide a purpose-built cart that can be swiftly implemented in a voting center. Referring to the drawings, one embodiment of a computer-implemented system is illustrated and generally indicated as 100 in FIGS. 1-5.

Figure 1B:
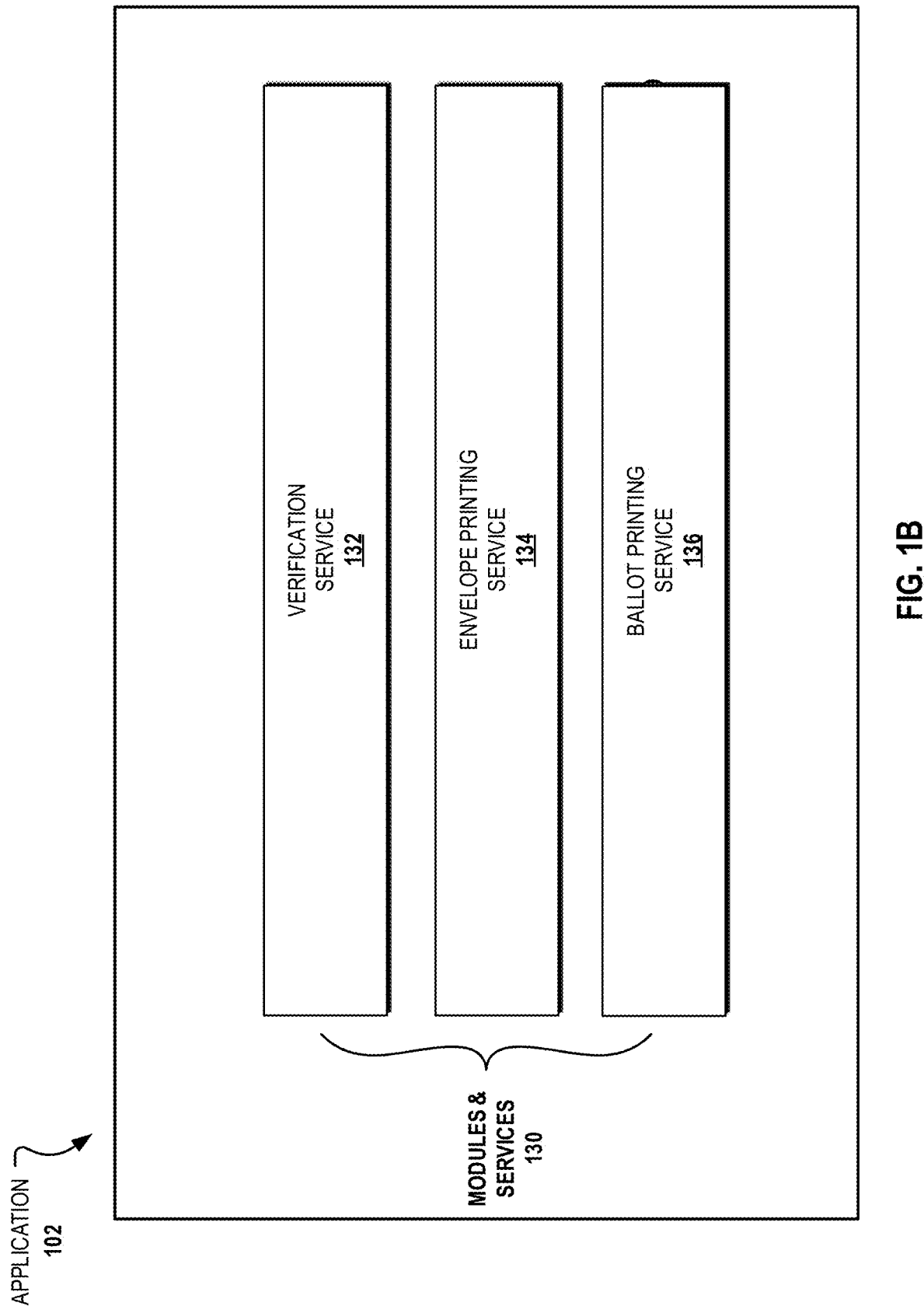
FIG. 1B is an application stack illustrating possible modules and associated processes of an application deployed with the computer-implemented system of FIG. 1A for printing ballots and associated ballot envelopes securely and on demand.

Referring to FIG. 1A and FIG. 1B, an exemplary computer-implemented system (hereinafter "system") 100 for implementing functionality associated with ballot and ballot envelope production, is shown. In general, the system 100 includes at least an application 102, a processor 104 that executes the application 102, and a printing apparatus 122 in operable communication with the processor 104 that prints ballots or similar elections documents (e.g., petitions) and corresponding envelopes based upon instructions provided by the processor 104. The components of the system 100 are non-limiting and other components may be included for specific printing and print configuration scenarios.

The processor 104 may include any number (one or more) of processing elements, which may be implemented onboard the printing apparatus 122, or implemented via one or more computing devices or combinations thereof (e.g., in a cloud environment). The processor 104, as configured in the manner described herein, controls various operations of the printing apparatus 122 that improve ballot and envelope production during elections. In particular, as shown in FIG. 1B, the application 102 may define a plurality of different modules and/or services 130 as shown, and may include any other associated software components. For example, the application 102 may define at least a verification service 132 for verifying eligibility of a voter; may define an envelope printing service 134 for managing the printing of an envelope for a ballot, and may further define a ballot printing service 136 for managing the printing of a ballot, as further described herein. In some embodiments, the modules and/or services 130 may be implemented as code and/or machine-executable instructions executable by the processor 104 that may represent one or more of a procedure, a function, a subprogram, a program, a routine, a subroutine, a module, an object, a software package, a class, or any combination of instructions, data structures, or program statements, and the like. In other words, one or more of the modules and/or services 130 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) of the application 102 may be stored in a computer-readable or machine-readable medium (e.g., main memory 704 of FIG. 5), and the processor 104 performs the tasks defined by the code. As such, the application 102 configures the processor 104 to provide functionality associated with the creation of ballots and associated envelopes on-demand and mail-in voter environments, among other features as described herein.

As indicated, in some embodiments the printing apparatus 122 includes or defines an envelope printer 124 and a ballot printer 126. The ballot printer 126 may be configured to print ballots or other similar elections documents, and the envelope printer 124 may be configured to print an envelope with affirmation information such as an affidavit with a signature line for a voter, so that the voter filling out the ballot for consideration by an elections office can further verify his/her identify. In addition, as described herein, each ballot and the envelope printed may uniquely relate to one another. For example, a ballot and a corresponding envelope may include a common machine-readable identifier, such as a serial number, a bar code, a QR code, and the like. In some embodiments, the printing apparatus 122 may take the form of a cart that is equipped to house both the envelope printer 124 and the ballot printer 126 such that the printing apparatus 122 can be efficiently deployed to a target location, such as a polling place, and can accommodate both envelope and ballot printing with a single hardware device. As described herein, aspects of the application 102 may be executed by processors or any number of computing devices (not shown) associated with the printing apparatus 122, so that the printing apparatus 122 may receive print instructions, access information from the application 102, or otherwise. In some embodiments, by non-limiting examples, the envelope printer 124 and/or the ballot printer 126 may comprise a OKI version b432, c532, c831, c931, or c9650, ora Lexmark version c4150 or cs923.

As further indicated, in some embodiments the processor 104 executing the application 102 accesses a voter registration (VR) database 112 (or information retrieved from the same by another device). The VR database 112 may store data associated with a list of individuals that are eligible voters in one or more particular localities for use at polling places. In some embodiments, the VR database 112 may include the name, registration information, and a unique identifier for each voter among other voter elements. In some embodiments, the application 102 configures the processor 104 to generate ballots and ballot envelopes for each voter by leveraging data accessed from the VR database 112 about a given voter. Data from the VR database 112 may accessed by the application 102 in real time, and/or the VR database 112 may be in operable communication with the processor 104 executing the application 102. In addition, in some embodiments, the processor 104 configured with the application 102 may access the VR database 112 by executing a call using one or more of a VR application programming interface (API) 114. The VR database 112 may be hosted remote from the processor 104 or whatever device is implementing the application 102. In some embodiments, the processor 104 accesses the VR database 112 indirectly, i.e., through a third party device and/or application managing the VR database 112 for a particular jurisdiction.

In some embodiments, the processor 104 is configured for administering and providing access to aspects of the application 102 via a network 106, which may include the Internet, an intranet, a virtual private network (VPN), and the like. In some embodiments, a cloud (not shown) may be implemented to execute one or more components of the system 100. In addition, aspects of the system 100 and/or the application 102 may be provided using platform as a service (PaaS), and/or software as a service (SaaS) using e.g., Amazon Web Services, or other distributed systems. Further, aspects of the application 102 may be outputted to a display device 105 as described herein.

In addition, as further shown, aspects of the application 102 may be accessible to a local computing device 108. The local computing device 108 may include a server workstation with at least one server, a controller, a personal computer, a terminal, a workstation, a portable computer, a mobile device, a tablet, a mainframe, or other such computing device. In some embodiments, the local computing device 108 may be associated with and may be generally located at a specific jurisdiction or elections center, such as a particular voting precinct that is responsible for e.g., generating, distributing, and managing ballots and associated envelopes, and generating and transferring data about the ballots to other devices. In some embodiments, the local computing device 108 may form part of the overall system 100 as shown (e.g., where the local computing device 108 is deployed to the particular voting precinct). In other embodiments, the local computing device 108 may simply be any device executed by an end-user for accessing and utilizing aspects of the application 102, or otherwise receiving information outputted from the processor 104 executing the application 102 and generated in response to information fed by the local computing device 108. In some embodiments, the local computing device 108 may be in operable communication (by wired connection or wirelessly connected) with at least one of a scanning device 110. The scanning device 110 may be a high-speed scanner, configured to scan and process ballots efficiently in cooperation with the local computing device 108 and the processor 104 as described herein. In one embodiment, the scanning device 110 may include, e.g., an ImageTrac Intelligent Production Scanner by IBML or other similar device. The scanning device 110 may be configured with high-volume scanning features such as multiple sort pockets, auto batching, pocket water falling, mixed document scanning, multi-feed detection, high capacity full page pockets, mechanical skew detection and correction, and other such features to accommodate the efficient scanning of large volumes of ballots documents or other such documents associated with elections services. In some embodiments, the scanning device 110 may include any device equipped with a camera or other image capture technology and capable of generating image data or digital images from an elections document, such as a ballot, and/or further capable of scanning and interpreting any number and type of machine-readable identifiers, such as bar codes, QR codes, and the like.

Further, the application 102 may have access to or be in operable communication with a SQL database 115. The SQL database 115 may store metadata associated with operations of the application 102, such a queries, and historical data. The SQL database 115 may further store and retrieve data requested by the application 102, and store information about users of the application 102.

Further still, at least some features of the application 102 may be made available to a plurality of user devices 120 in communication with the processor 104 of the system 100 and/or the local computing device 108 via the network 106. The plurality of user devices 120 may include, without limitation, a controller, a personal computer, a terminal, a workstation, a portable computer, a mobile device, a tablet, a phone, a pager, and a multimedia console. The plurality of user devices 120 may be accessible to or associated with administrators, elections officials, or other such users. For example, using one or more of the user devices 120, an elections administrator may log-in to aspects of the application 102 to manage and monitor aspects of the printing process of the ballots and envelopes.

In general, the application 102 and the system 100 accommodate voting jurisdictions with ballot printing environments to print a ballot and envelope at the request of a voter in early voting environments. Implementation of the system 100 is of particular usefulness at voting locations where there is a ballot on demand environment, and a need to also print the vote-by-mail envelope for that ballot. The design of the system 100 allows for the jurisdiction to print the voter's ballot on demand and ballot envelopes in order to adhere to voting guidelines under election regulations. A voter may check-in to vote for the current election, a ballot may be produced specifically upon a request, and the accompanying envelope may then be produced to secure that voted ballot. The application 102 executed by the processor 104 provides jurisdictions flexibility to facilitate voting opportunities with various voting locations to offer early voting.

For example, a voting location may be established by a jurisdiction for an election. Aspects of the system 100 may be implemented or accessed by devices equipped at the voting location. In some embodiments, for example, the local computing device 108 may include check-in equipment comprising any number of devices suitable for receiving or accessing voter information and selections from a voter. A network connection or other communication channel may be established via the network 106 between the local computing device 108 and the processor 104. In some embodiments, a router (not shown) may also be deployed to provide fail-over connections between the processor 104 (and the application 102) and the local computing device 108.

Figure 2:
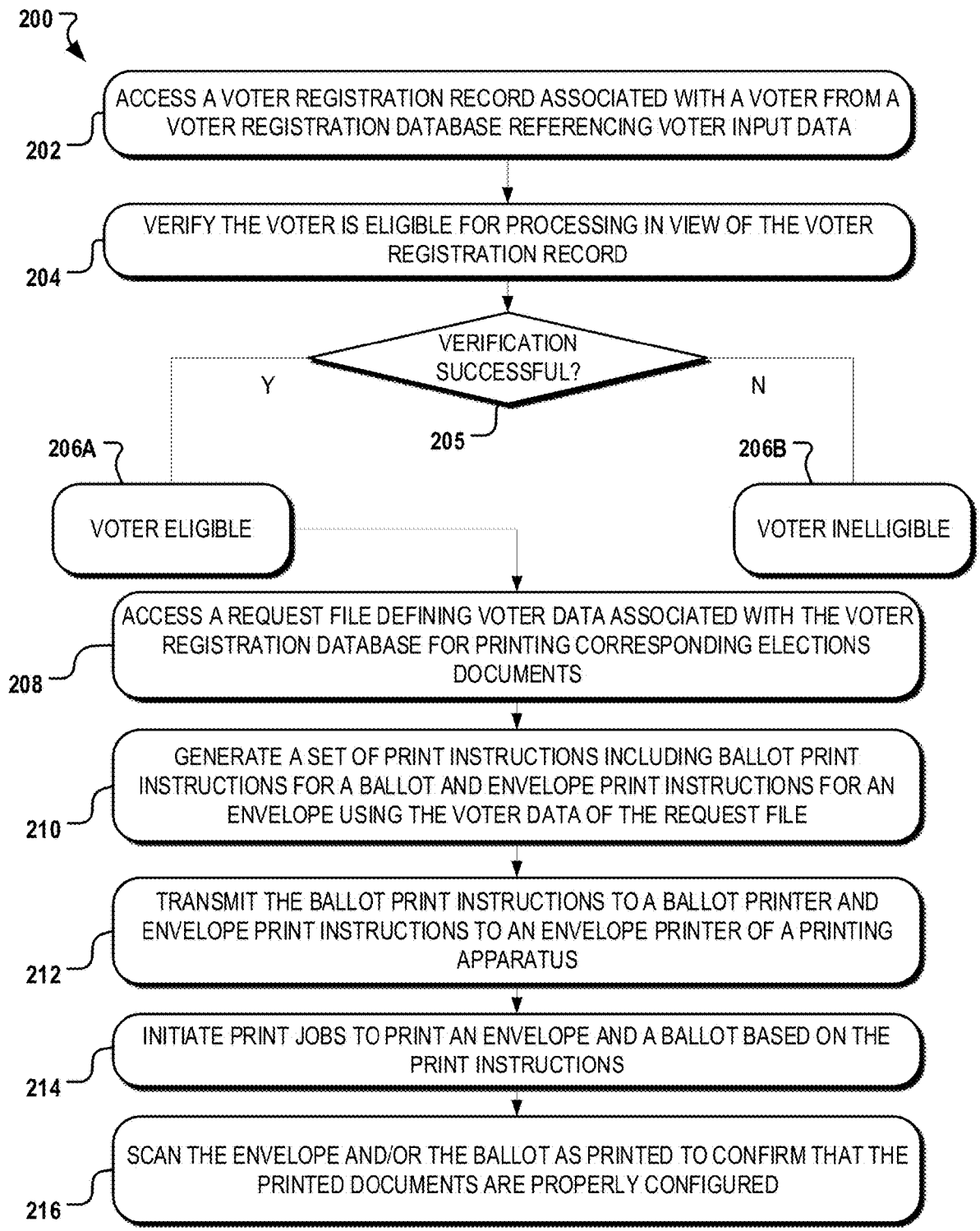
FIG. 2 is a simplified block diagram of a flow chart showing an exemplary process flow for printing ballots and associated ballot envelopes securely and on demand.

Referring to FIG. 2 and the process flow 200, further details and an exemplary implementation of the system 100 shall now be described. Referring to block 202 and with reference to FIG. 3, a voter registration record 140 is identified and accessed by the processor 104 in view of input data 142 provided by a voter. For example, a voter enters a polling location or elections office, and the voter provides the input data 142 digitally through a user interface 144 of a device 146 such as a polling station or general computing device. The input data 142 defines identifying information associated with the voter and may include, e.g., the voter's name, birthdate, or other information that the voter may provide via any number of graphical fields or input boxes of the user interface 144. The processor 104 is configured to access the identifying information of the input data 142, and the identifying information may then be used by the processor 104 to issue a query 147 to the voter registration (VR) database 112 to return the voter registration record 140 (VR RECORD in FIG. 3) to the processor 104. In some embodiments, the input data 142 is provided by the voter remotely; e.g., via a browser, as the voter is requesting a provisional, early, or mail-in ballot, or for whatever reason.

In block 204 (and referencing decision box 205), utilizing the application 102 or otherwise, the processor 104 analyzes the voter registration record 140 returned from the VR database 112 to determine whether the voter is eligible for voting (206A) at the subject polling location, or whether the voter is ineligible for voting (206B) for whatever reason (e.g., whether the voter has already voted). Accordingly, in some embodiments, printing election documents for the voter is conditioned upon successful verification of eligibility by the processor 104. If the voter is deemed ineligible, the processor 104 can issue an instruction to the device 146 to display a message to the voter along the user interface 144 indicating that election documents cannot be produced because of ineligibility, or for any other reasons.

Figure 3:
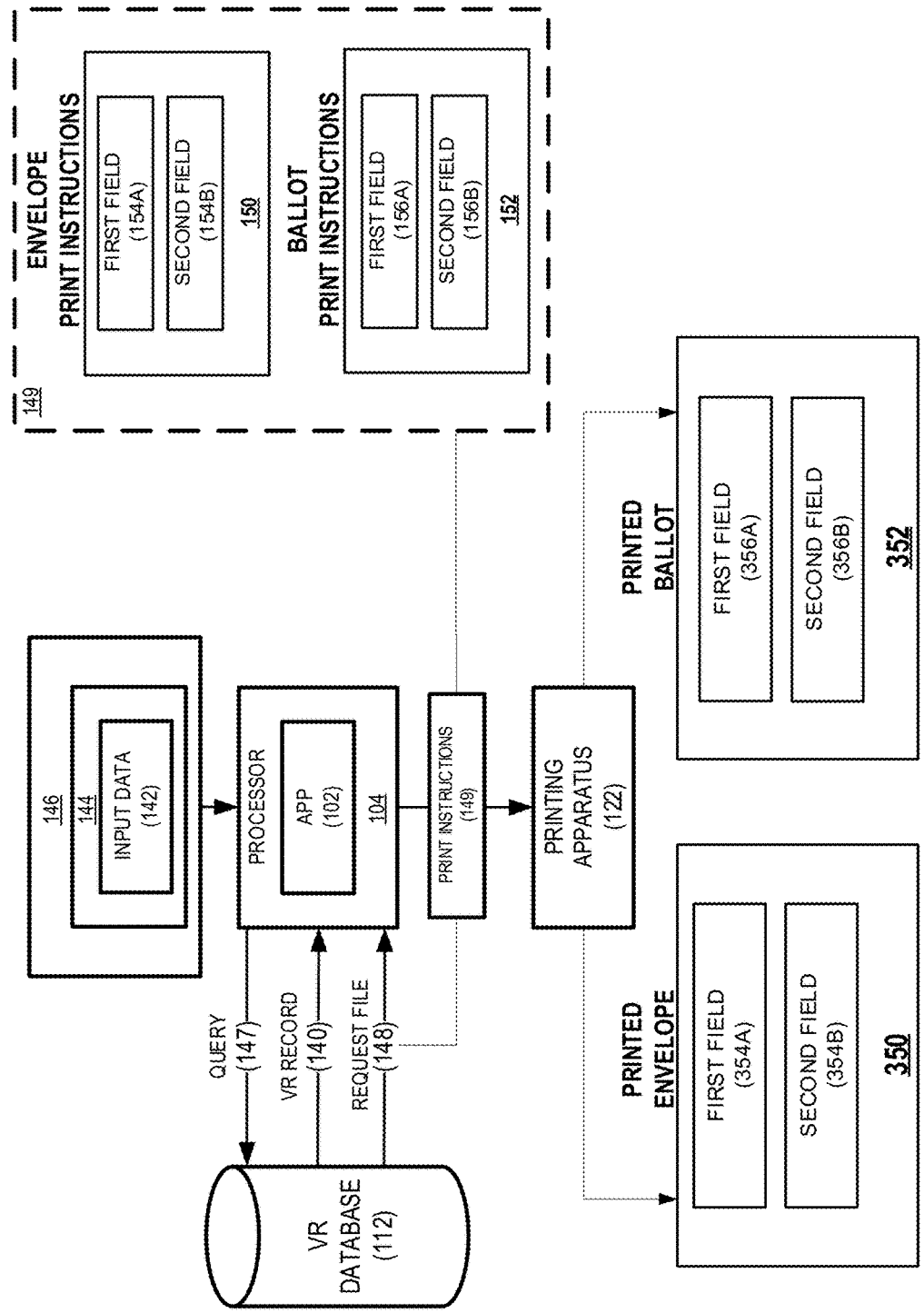
FIG. 3 is a simplified block diagram of a printing apparatus for generating ballots and associated envelopes as described herein.

Referencing block 208, where the voter is eligible for voting in block 206A, a request file 148, or a file generated upon request by the processor 104 or otherwise requested by some device, is accessed by the processor 104 to dynamically produce election documents for the voter. In some embodiments, as indicated in FIG. 3, the processor 104 executing the application 102 may request, receive, or otherwise access the request file 148 from the VR database 112 or indirectly from a third party intermediary application or system. The request file 148 may be a .txt file, or embodied in some similar file format and defines information about the voter (voter data) as stored in the VR database 112. For example, in some embodiments, the request file 148 includes a subset of the voter's complete voter registration record, and includes information corresponding to multiple predetermined fields; i.e., the request file 148 defines predetermined parameters of a voter, such as the voter's address, name, etc.

Figure 4A:
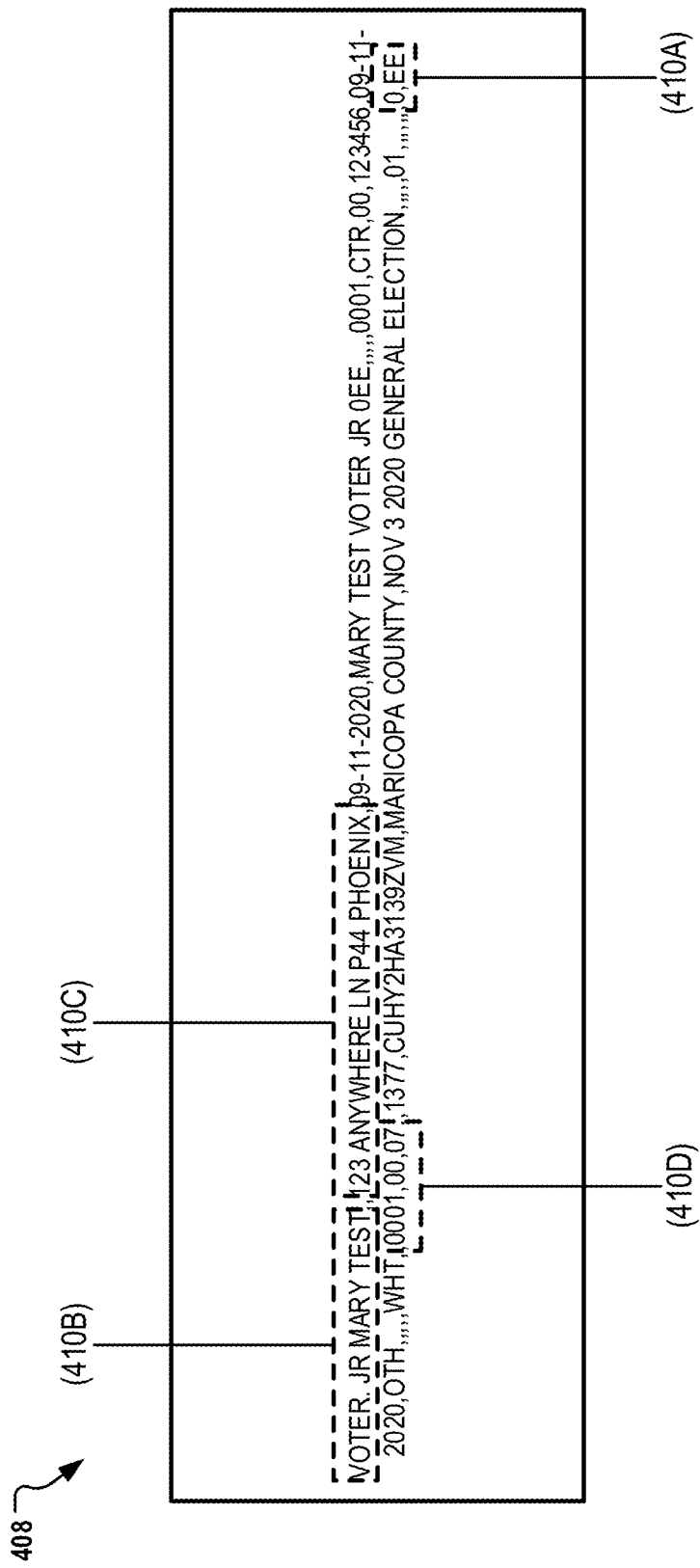
FIG. 4A is an illustration showing aspects of an exemplary request file based on information from a voter registration database that is used printing elections materials.

One example of the request file 148 is shown in FIG. 4A as request file 408. As illustrated, the request file 408 may define a string of characters and/or fields of information related to the voter. In the non-limiting example shown, four possible fields 410A-410D are annotated for demonstration. A first field 410A defines an identifier or name of the request file, populated with the parameter, "OEE." A second field 410B defines a name field populated with the example name, "VOTER JR MARY TEST." A third field 410C defines an address field for the voter, populated with the example address, "123 ANYWHERE LANE." In addition, a fourth field 410D defines a ballot identifier populated with the information, "0001,00,07" which denotes a particular ballot type or ballot template suitable for the voter. It is contemplated that the request file 408 may include additional and different voter fields and parameters. The processor 104 is configured with any number of functions or instructions to automatically recognize the receipt or presence of a request file in a folder, memory, or storage device based on, e.g., the structure and/or various characteristics of the request file 148/408 shown in FIG. 4A, such as the presence of the fields shown or otherwise.

Referencing block 210, the processor 104 as configured by or otherwise executing the application 102 interprets the contents and parameters of the request file 148, and identifies the location of the voter (from e.g., field 410C providing the address of the voter), in order to generate a set of print instructions 149 including ballot print instructions 152 and envelope print instructions 150 corresponding to the ballot print instructions 152 using the voter data defined by the file 148 including the location of the voter, and in some embodiments other parameters and information from the request file 148. In other words, using at least data accessed from the file 148, the print instructions 149 may be generated including the envelope print instructions 150 for the envelope printer 124 and the ballot print instructions 152 may also be concurrently generated for the ballot printer 126. This maximization of utility of the file 148 increases the efficiency of the printing apparatus 122 to generate elections documents quickly and accurately for the voter, and also helps to ensure that the ballot and corresponding envelope ultimately printed included the same or similar information, can be cross-matched, or otherwise reference one another in some way.

Figure 4B:
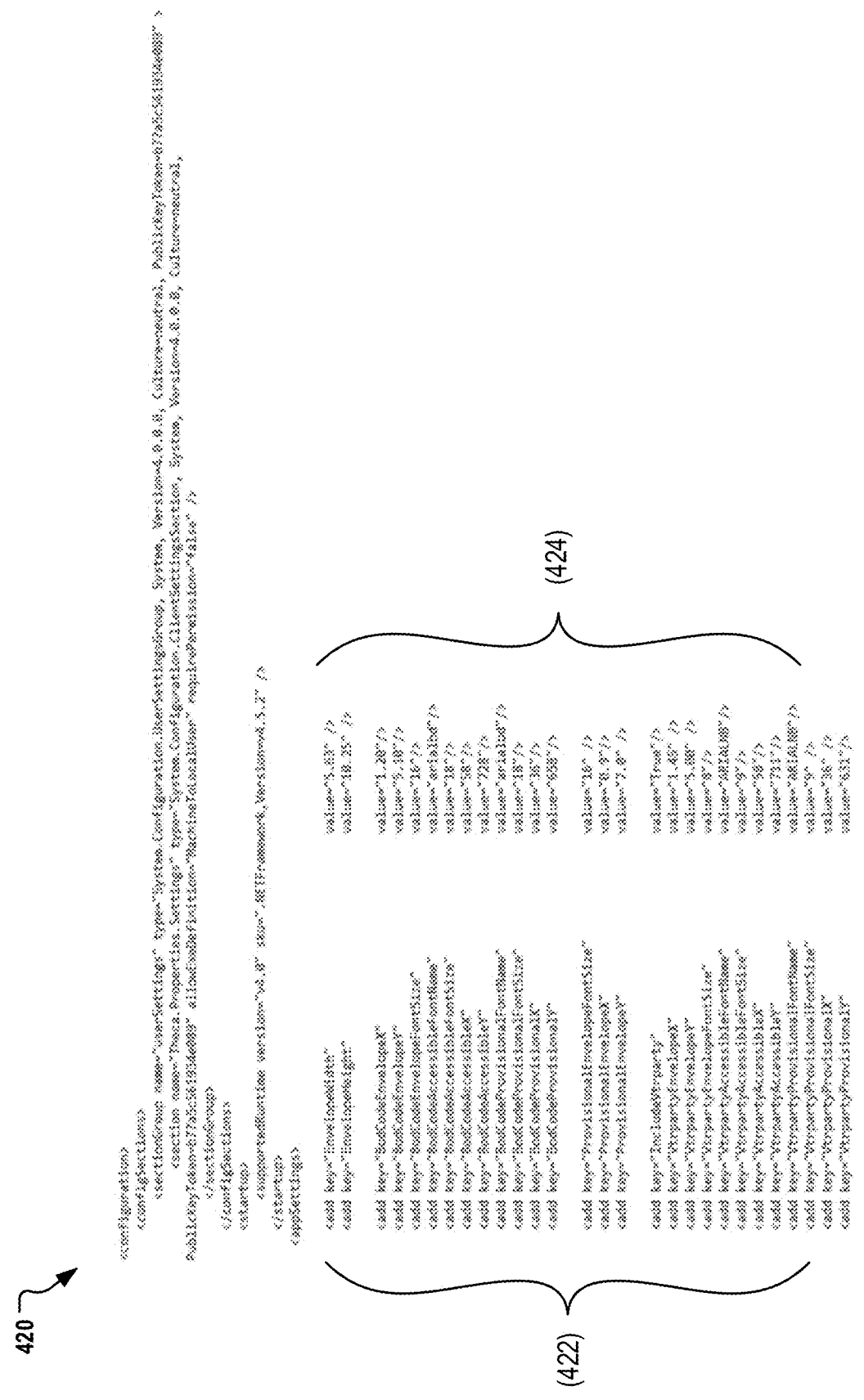

In some embodiments, the envelope print instructions 150 are generated by the processor 104 by applying the request file 148 to a configuration file in some form. An example is shown in FIG. 4B as configuration file 420. In these embodiments, the configuration file 420 comprises a blueprint or template, preconfigured as a set of layout and formatting instructions for arranging the various parameters/information/values of the request file 148/408 along the envelope print instructions 150 for the voter. In other words, the configuration file 420, which may be generated in XML format (plaintext structured XML document), defines the X/Y coordinates of any fields that should appear on the envelope ultimately printed in view of the envelope printing instructions 150 or other outputs. For example, the configuration file 420 includes code/instructions that specify elements 422 and values 424 corresponding to and configured for each of the elements 422 (e.g., key-value pairs); the elements 422 and values 424 defining the x/y coordinates, formatting, layout, and other characteristics of the envelope print instructions 150, and defining where various values of the request file 408 should be positioned along the envelope print instructions 150. It can be seen in FIG. 4B for example that the key, "BODCodeEnvelopeX" is assigned a value of "1.20" which relates to 1.2 inches and sets a particular position for rendering the ballot identifier referenced from the fourth field 410D of the request file 408 along the envelope print instructions 150. In some embodiments, the values 424 of the configuration file 420 relate to pixels or x/y pixel coordinates for rendering the fields 154 of the envelope print instructions 150. For example, as indicated at the bottom of the configuration file 420 of FIG. 4B, one of the elements 422, designated "VtrpartyProvisionalX," is configured with an X coordinate of "36," and another element of the elements 422 designated "VtrpartyProvisionalY," is assigned a value of "631"; indicating that a Voter Party Field of the fields 154 of the envelope print instructions 150 should be positioned 36 pixels from the left and 631 pixels from the top of the Provisional Ballot Receipt field of the fields 154 of the envelope print instructions 150.

Referencing block 212 and block 214, a first set of print instructions, i.e., the ballot print instructions 152, are sent by the processor 104 to the ballot printer 126, and a second set of print instructions, i.e., the envelope print instructions 150, are sent by the processor 104 to the envelope printer 124. In some embodiments, both of the envelope print instructions 150 and the ballot print instructions 152 are generated at least in part from the information of the request file 148/408. For example, as indicated above, the information of the request file 408 may be applied to the configuration file 420 to generate the envelope print instructions 150 as described. Similarly, the processor 104 as configured may generate the ballot print instructions 152 by, e.g., referencing a ballot identifier or other information from the request file 408, such as the ballot code identifier "0001,00,07" of field 410D of the request file 408. In this manner, the ballot code identifier, "0001,00,07," can denote a particular ballot type or template suitable for the voter based on the voter's location, party affiliation, etc., and the ballot print instructions 152 may be generated by the processor 104 or may be predefined and referenced by the processor 104 from a database based on the ballot code identifier "0001,00,07" of field 410D of the request file 408.

As indicated in block 214, leveraging the set of print instructions 149 as transmitted by the processor 104, the envelope printer 124 of the printing apparatus 122 may initiate an envelope print job to produce a printed envelope 350, and the ballot printer 126 of the printing apparatus 122 may initiate a ballot print job to produce a printed ballot 352. As shown in FIG. 3, the envelope print instructions 149 define a plurality of fields, shown by example as first field 154A and second field 154B. Accordingly, the printed envelope 350 as produced by the printing apparatus 122 also includes at least a first field 354A and a second field 354B; the first field 154A defined by the envelope print instructions 150 providing a blueprint or template for the ultimate physical parameters characteristics of the first field 354A, and the second field 154B defined by the envelope print instructions 150 providing a blueprint or template for the ultimate physical parameters characteristics of the second field 354B. Similarly, the printed ballot 352 as produced by the printing apparatus 122 also includes at least a first field 356A and a second field 356B; the first field 156A defined by the ballot print instructions 152 providing a blueprint or template for the ultimate physical parameters characteristics of the first field 356A, and the second field 156B defined by the ballot print instructions 152 providing a blueprint or template for the ultimate physical parameters characteristics of the second field 356B. The printed envelope 350 provides a secure container for the corresponding printed ballot 352 which differs from conventional polling intake machines that use tabulation and lack envelopes. In addition, as described herein, any of the fields 354 of the printed envelope 350 may include a signature line with affidavit information so that the voter can verify their identify using the printed envelope 350.

Figure 4C:
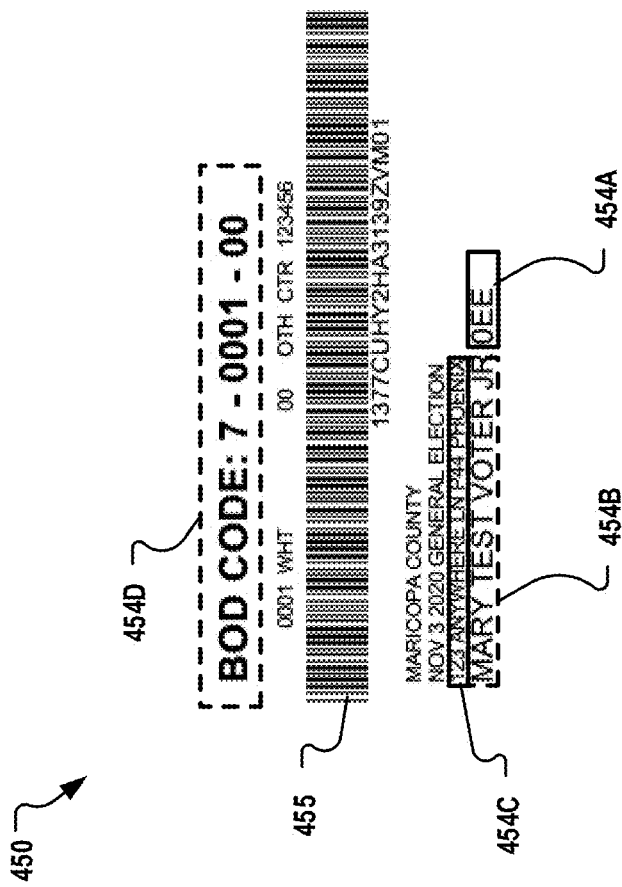
FIG. 4C. is an illustration of exemplary envelope print instructions generated by the processor in view of the request file referenced in FIG. 4A and the configuration file referenced in FIG. 4B.
Figure 4D:
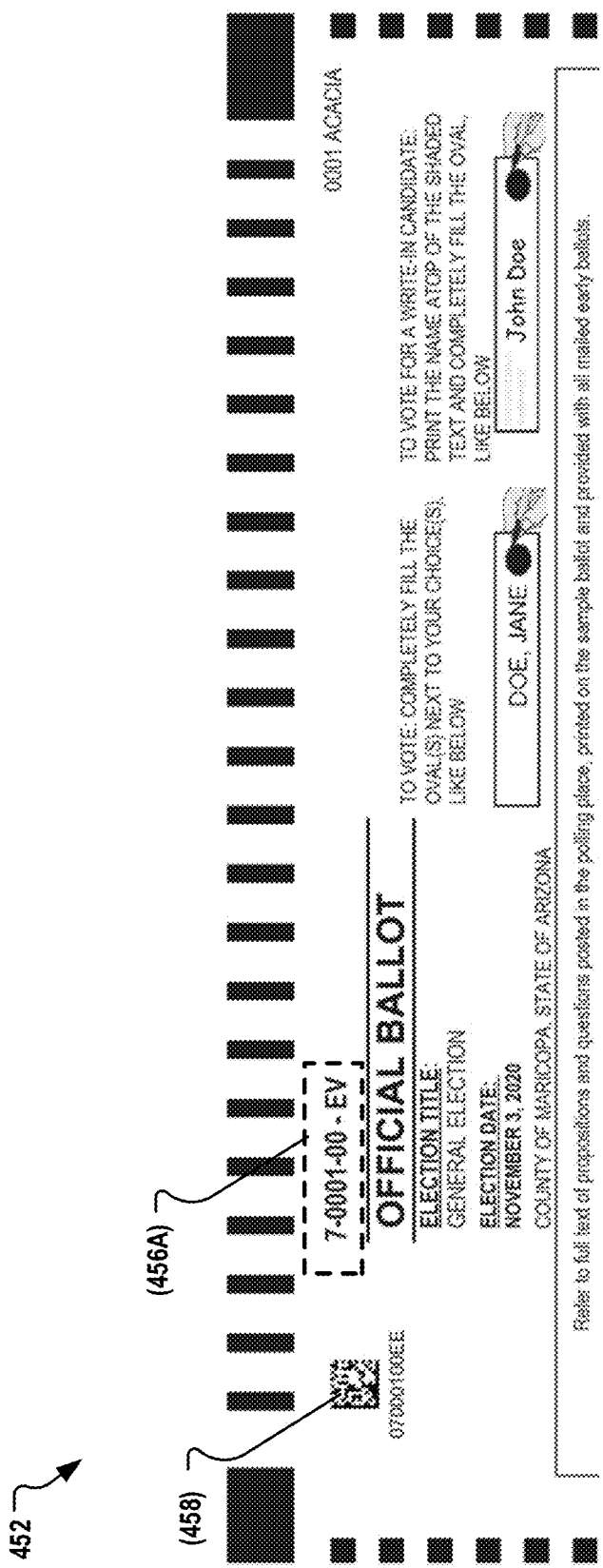
FIG. 4D is an illustration of exemplary ballot print instructions generated by a processor in view of the request file of FIG. 4A.

Referring to FIG. 4C and FIG. 4D, the formation of the print instructions 149 and execution thereof is further illustrated, leveraging the request file 408 of FIG. 4A. Specifically, FIG. 4C illustrates a particular example of the envelope print instructions 150, designated envelope print instructions 450, generated by the processor 104 applying information of the request file 408 of FIG. 4A to the configuration file 420 of FIG. 4B. As shown, envelope print instructions 450 define a field 454A for rendering and positioning information from the request file 408 such as the "OEE" file identifier taken from field 410A of the request file 408, a field 454B for positioning and rendering the name of the voter populated with the voter name from field 410B of the request file 408, a field 454C for positioning and rendering the address of the voter populated with the voter address from field 410C of the request file 408, and a field 454D for positioning and rendering the ballot identifier ("0001,00,07") associated with the voter populated from field 410D of the request file 408. In addition, the envelope print instructions 450 may include a machine-readable identifier 455, which may take the form of a bar code, QR code, or any other type of machine-readable identifier example defined herein that defines information of the voter taken from the request file 408, and can later by scanned by a camera or some optical device (e.g., scanning device 110) to retrieve the same information of the voter from the request file 408.

Similarly, the request file 408 of FIG. 4A is leveraged for generating ballot print instructions 452 shown in FIG. 4D, which represents an example of the ballot print instructions 152. As shown, the print instructions 452 includes a field 456A corresponding to the field 454D, for referencing the same ballot identifier "0001,00,07" initially retrieved from the request file 148/408. In addition, the ballot print instructions 452 may include a machine-readable identifier 458, which may take the form of a bar code, QR code, or any other type of machine-readable identifier example defined herein that defines information associated with the ballot including style, formatting and any other parameters. Like the machine-readable identifier 455, the machine-readable identifier of the ballot print instructions 452 can later by scanned by a camera or some optical device to retrieve the same information of the voter from the request file 408. Any of the print instructions 149 referenced herein including examples thereof such as envelope print instructions 450 and ballot print instructions 452 may be embodied in PDF, TIF, or other formats suitable for print by the printing apparatus 122.

Any of the fields 154 and 156, and any of the fields 354 and 356, may include corresponding information such as a voter identification number or voter ID, voter information, a physical address, party affiliation, and a bar code. In other words, both of the printed envelope 350 and the printed ballot 352 are printed on demand for the voter with predetermined fields using the printing apparatus 122, such that at least some of the fields 354 of the printed envelope 350 match or otherwise correspond to the fields 356 of the printed ballot 352. In this manner, referencing block 216, the fields 354 of the printed ballot 352 may be cross-matched with the fields 354 of the printed envelope 350 to verify that the printed documents should be distributed to the voter together; i.e., the printed envelope 350 includes information predetermined to be required for receiving and processing the printed ballot 352. The processor 104, based on the voter data defined by the file 148, generates the print instructions 149 such that the printed documents relate to one another in this manner. For example, in some embodiments at least one of the fields 154 of the envelope print instructions 150 corresponds with at least one of the fields 156 of the ballot print instructions 152; i.e., one of the fields 154 is identical to one of the fields 156, or one references the other in some form. For example the first field 154A of the envelope print instructions 150 may define an identifier that matches with an identifier of the first field 156A of the ballot print instructions 152.

In some embodiments, any one of the fields 154 of the envelope print instructions 150 may include a machine-readable identifier, such as any kind of a bar code, QR code, and/or an optical, machine readable representation of a dataset that is used to describe the printed envelope 350 and define or identify the corresponding printed ballot 354 predetermined to be matched with the printed envelope 350. Any of the fields 156 of the ballot print instructions 152 may include the same machine-readable identifier, or some identifier for referencing the machine-readable identifier of the envelope print instructions 150 so that at least some of the fields 154 of the envelope print instructions 150 at least partially cross match with some fields 156 of the ballot print instructions 152.

The machine readable identifiers used to identify aspects of the voter and to correlate the envelope and the ballot may include any data in a format that can be interpreted by a computing device, and may include structured data, such that the data of the identifier includes organized data elements according to some predetermined data model; the data model defining how the elements relate to one another and to properties of real-world concepts such as a precinct, zip code, party affiliation, etc. In some embodiments, the machine-readable identifier includes a bar code, and specifically comprises a "205" bar code or "interleaved 2 of 5" bar code. In some embodiments, the bar code may encode an 8-digit numeric value/eight bit characters, where each of the digits define certain codes. For example, a first digit of the bar code may define a party affiliation such that where the bar code reads "01" for that first digit, the bar code indicates a designation of a Republican party affiliation; or the bar code may read "02" for that digit such that the bar code indicates a designation of a Democratic party affiliation. The bar code itself may define any number of different subfields (e.g., three), that reflect information that can be used to cross match the printed envelope 350 with the printed ballot 354 or define information unique to a voter as based on the request file 148.

In some embodiments, where machine readable identifier includes a bar code that comprises an interleaved 2 of 5 (ITF) code, the bar code may define a continuous two-width barcode encoding the described digits. The digits may be encoded in pairs—where the first digit is encoded in a predetermined plurality of bars of the bar code, while the second digit is encoded in the white spaces interleaved with the predetermined plurality of bars. Two out of every five bars of the bar code may be wider relative to other bars—thus the designation, "2 of 5".

Additional embodiments and features are contemplated and related to the subject matter described herein. For example, in some embodiments the application 102 may be implemented using a parallelization feature to parallelize the functionality of certain functions or processes, such as the verification service 132, the envelope printing service 134, and/or the ballot printing service 136. By way of background, in some embodiments, the present inventive concept may utilize multiple modules, services, or programs combined as part of the system 100, and many of such programs may utilize low-level code that cannot take full advantage of server hardware but also cannot be executed in a multi-threaded fashion. These programs can therefore only scale out by running on their own processes.

The parallelization feature may relate to a proprietary software processing system in which a process with any number of clones can check work out from an assignment provider, do the work, then check it back in as "Complete" or, in the case of a shutdown request, before the work is done, "Incomplete". Any such process can run by itself or in parallel with any number of clones to scale out without duplicating any work. Because certain operating systems require that any process be installed by a uniquely signed installer, the deployment of this architecture may be made possible by a separate, also proprietary system. A build system (not shown) may be implemented with the described parallelization feature that dynamically builds a single codebase into an installation program which embeds unique installers for the number of processes requested. In other words, using the described parallelization feature, multiple services or processes, such as the verification service 132, the envelope printing service 134, and/or the ballot printing service 136, may be executed and running parallel in order to more effectively utilize the CPU/processor 104.

Figure 5:
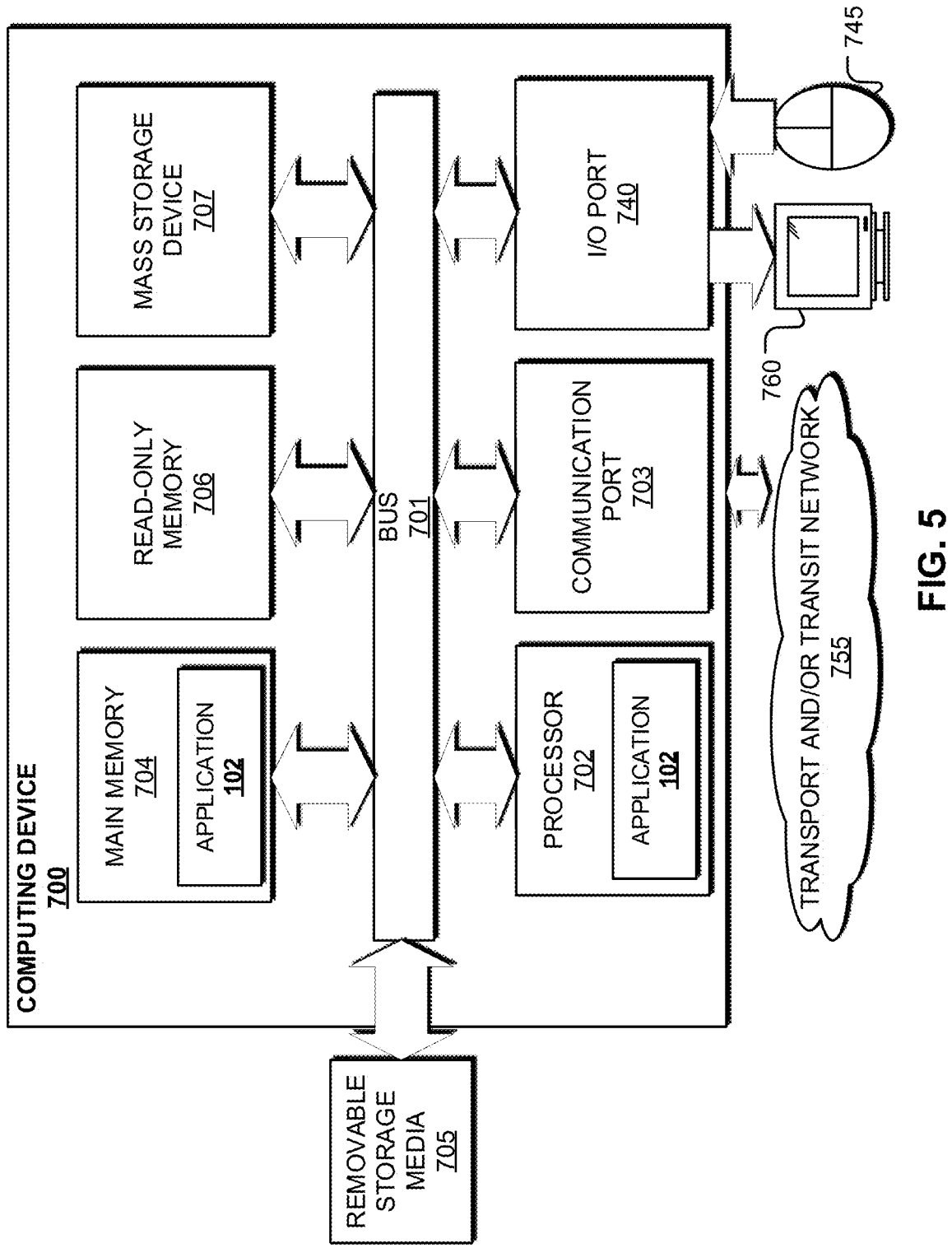
FIG. 5 is a simplified block diagram showing an example of a computing system that may implement various services, systems, and methods discussed herein.

FIG. 5 is an example schematic diagram of a computing device 700 that may implement various methodologies discussed herein. For example, the computing device 700 may include a processor 702 that takes the place of the processor 104 and is configured via the application 102 for executing or accessing functionality associated with envelope and ballot production as described herein. The computing device 700 includes a bus 701 (i.e., interconnect), at least one of the processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2° processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 102 that supports functionality discussed above. In other words, aspects of the application 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A computer-implemented system for dynamically generating election documents, comprising:
    a printing apparatus, including:
        a first printer configured for printing a ballot, and
        a second printer configured for printing an envelope associated with the ballot and a voter; and
    a processor in operable communication with the printing apparatus, and configured to:
        access a request file defining voter data from a voter registration database,
        generate, by the processor applying the request file, a set of print instructions including ballot print instructions for a ballot and envelope print instructions for an envelope, both of the ballot print instructions and the envelope print instructions generated using the request file, the set of print instructions including instructions for printing a first machine-readable identifier for the envelope, and
        transmit an instruction to the printing apparatus to print the ballot and the envelope using at least a portion of the voter data defined by the request file, the envelope including the first machine-readable identifier corresponding to the voter.

2. The computer-implemented system of claim 1, wherein the processor is further configured to:
    generate the envelope print instructions by applying the request file to a configuration file, the configuration file including a set of formatting and layout instructions pre-configured for the envelope.

3. The computer-implemented system of claim 1, wherein the first machine-readable identifier of the envelope is printed as an interleaved 2 of 5 (ITF) code that matches a ballot ITF code.

4. The computer-implemented system of claim 3, wherein the envelope interleaved 2 of 5 (ITF) code defines at least a voter identifier and a predetermined character set associated with a voter party affiliation.

5. The computer-implemented system of claim 1, wherein the envelope and the ballot are printed with a matching color code identifier.

6. The computer-implemented system of claim 1, wherein the envelope is printed with an affidavit region for receiving a signature of the voter.

7. The computer-implemented system of claim 1, wherein the processor is further configured to:
    access voter input data from the voter;
    execute a query for a voter registration record from the voter registration database based on the input data; and
    verify eligibility of the voter by comparing the voter input data with the voter registration record.

8. The computer-implemented system of claim 1, wherein the processor is further configured to:
    generate the ballot print instructions with a second machine-readable identifier, the second machine-readable identifier defining a unique ballot style for the voter based on information of the voter from the request file.

9. A method of generating elections documents, comprising:
- identifying a request file by a processor configured to recognize predetermined fields populated with voter information and a ballot identifier of a voter defined by the request file, the request file generated from information from a voter as stored in a voter registration database;
- generating envelope print instructions by a processor, including applying aspects of the request file to a configuration file configured with x and y coordinates for placement of the predetermined fields of the request file along an envelope; and
- generating ballot print instructions by the processor by leveraging a ballot style identifier defined by the request file.

10. The method of claim 9, further comprising:
- rendering a first machine-readable identifier along the envelope print instructions, the first machine-readable identifier when scanned defining information of the voter from the request file.

11. The method of claim 9, wherein the configuration file defines layout and formatting instructions in a plaintext structured XML document.

12. A tangible, non-transitory, computer-readable media having instructions encoded thereon, the instructions, when executed by a processor, are operable to:
- access a request file by a processor, the request file defining predetermined fields populated with voter information and a ballot identifier of a voter and generated from information from a voter as stored in a voter registration database;
- generate envelope print instructions by a processor, including applying aspects of the request file to a configuration file configured with x and y coordinates for placement of the predetermined fields of the request file along an envelope; and
- generate ballot print instructions by the processor by leveraging a ballot style identifier defined by the request file.

13. The tangible, non-transitory, computer-readable media of claim 12, comprising additional instructions that, when executed by the processor, are operable to:
- render a first machine-readable identifier along the envelope print instructions, the first machine-readable identifier when scanned defining information of the voter from the request file.

14. The tangible, non-transitory, computer-readable media of claim 13, comprising additional instructions that, when executed by the processor, are operable to:
- render a second machine-readable identifier along the ballot print instructions, the second machine-readable identifier when scanned defining a ballot style associated with the ballot identifier defined by the request file.

\* \* \* \* \*